United States Patent [19]
Diekhans

[11] Patent Number: 6,073,070
[45] Date of Patent: Jun. 6, 2000

[54] AGRICULTURAL VEHICLE WITH TREATMENT DEVICE WHICH IS ADJUSTABLE IN ITS POSITION AND/OR ORIENTATION RELATIVE TO THE VEHICLE

[75] Inventor: Norbert Diekhans, Guetersloh, Germany

[73] Assignee: Claas KGaA, Harsewinkel, Germany

[21] Appl. No.: 08/971,660

[22] Filed: Nov. 17, 1997

[30] Foreign Application Priority Data

Nov. 16, 1996 [DE] Germany ............ 196 47 523

[51] Int. Cl.⁷ ............ G06F 7/00
[52] U.S. Cl. ............ 701/50; 701/1; 701/200; 340/988; 340/990; 180/167
[58] Field of Search ............ 701/1, 50, 200, 701/207, 215, 216, 217, 300; 340/988, 990; 342/357.14, 357.17, 357.12; 180/167, 6.7, 41; 280/5.514, 6.157

[56] References Cited

U.S. PATENT DOCUMENTS

| | | | |
|---|---|---|---|
| 5,471,391 | 11/1995 | Gudat et al. | 701/50 |
| 5,538,266 | 7/1996 | Martin et al. | 280/6.12 |
| 5,923,270 | 7/1999 | Sampo et al. | 340/988 |

FOREIGN PATENT DOCUMENTS

| | | |
|---|---|---|
| 0 723 740 A1 | 7/1996 | European Pat. Off. |
| 1 555 360 | 1/1971 | Germany. |
| 155 157 | 5/1982 | Germany. |
| 40 04 247 A1 | 8/1991 | Germany. |
| 40 11 316 | 10/1991 | Germany. |
| 44 23 083 A1 | 1/1995 | Germany. |
| 195 04 475 A1 | 8/1995 | Germany. |
| 44 23 623 A1 | 1/1996 | Germany. |
| 44 26 059 | 2/1996 | Germany. |
| 44 31 824 C1 | 5/1996 | Germany. |
| 195 44 112 A1 | 5/1997 | Germany. |
| WO 95/02318 | 1/1995 | WIPO. |

Primary Examiner—William A. Cuchlinski, Jr.
Assistant Examiner—Yonel Beaulieu
Attorney, Agent, or Firm—Michael J. Striker

[57] ABSTRACT

An agricultural vehicle has a main vehicle, a treatment device arranged adjustably relative to the vehicle with respect to at least one of a position and an orientation of the treatment device, a satellite navigation receiving unit, and an evaluating unit which determines from data of the satellite navigation receiving unit an absolute position of at least one reference point on the treatment device in a terrestrial reference system.

28 Claims, 7 Drawing Sheets

AGRICULTURAL VEHICLE WITH TREATMENT DEVICE WHICH IS ADJUSTABLE IN ITS POSITION AND/OR ORIENTATION RELATIVE TO THE VEHICLE

BACKGROUND OF THE INVENTION

The present invention relates to an agricultural vehicle with a treatment device which is adjustable relative to the vehicle in its position and orientation, wherein the agricultural vehicle is provided with a GPS satellite navigation receiving unit.

Agricultural vehicles such as harvesters, tractors, etc as a rule are provided with a treatment device which is movable and/or adjustable to achieve a spacial position and orientation. Such treatment devices are for example a cutting bar of a harvester, a plough of a tractor, and a device for applying fertilizers or plant protective agents. The position and orientation of the treatment device relative to the vehicle are influenced by manual control by a vehicle driver or by an automatic regulation with sensors for determination of the position and orientation. The control of the position and orientation of the treatment device can be both active so as to operate by controlling of adjusting drives (for example a front loader on a tractor), and also passive by controlling of the vehicle (for example a vehicle trailer).

Other agricultural vehicles are known, in which, in addition to the position and orientation of the treatment device relative to the vehicle, also the position and orientation of the treatment device relative to the ground surface is changeable. For example in a combined harvester, a device and a method are known in accordance with which the cutting height or in other words the height of the cutter bar over the ground surface can be adjusted and regulated. With the adjustment and regulation of the position and orientation of the treatment vehicle, frequently nominal and limiting values for the parameter which describe the position and orientation are provided. Thus, nominal values for the cutting height of a combined harvester in dependence on the harvested product are known. A lower limiting value for the cutting height is determined so as to prevent damages to the cutter bar. An upper limiting value is determined by the growth height of the harvested product.

The position and orientation of the treatment device relative to the vehicle and relative to the ground are dependent on one another. The dependency is determined by the properties of the ground and therefore generally is known only insufficiently. For the operation of the agricultural vehicle is the position and orientation of the treatment device relative to the ground is however important. Methods are known, in accordance with which the position and orientation of the treatment device relative to the ground are measured, and the position and orientation relative to the vehicle is regulated by adjustments. This is provided for the operation of a combine harvester, for example by an AUTO-CONTOUR method of the applicant. In many cases, however, the vehicle driver compensates the changed ground property by a manual control.

Furthermore, from the German patent document DE 44 31 824 C1 a method is known, which connects the operational data of a combine harvester with the corresponding space coordinate determined in a historic data cadastre and provides from it nominal or limiting operational values for a new treatment. The space coordinates are determined in the prior art by means of a satellite navigation system on the vehicle.

Furthermore, the German patent document DE 195 44 112.5 discloses a method for generation of three-dimensional digital terrain models with a vehicle having a satellite navigation system. For the generation of digital terrain models and the generation of data cadastres in the known method the position of a point on the vehicle is considered to be as the basis. For the operation of the vehicle however the position and the orientation of the treatment device is decisive. The accuracy of the produced terrain model is therefore not better than the dimensions of the vehicle permit. This can lead, especially for large machines with broadly arranged treatment devices, to inaccuracies in the terrain model or in data cadastre. The high accuracy of the currently available satellite navigation systems is not completely used in this method. When it is necessary in addition to use the operation data cadaster for regulation of the position and orientation of the treatment device, then the uncertainties in the position of the treatment device make necessary the control and eventually the engagement of the vehicle driver. Since the above mentioned uncertainties first of all occur on uneven terrain, in which the concentration of the vehicle driver must be increased anyway, this can lead to the fact that the efficiency of the agricultural vehicle is not fully utilized or operational disturbances are caused.

SUMMARY OF THE INVENTION

Accordingly, it is an object of the present invention to provide an agricultural vehicle with a treatment device arranged adjustably relative to a vehicle as to its position and/or orientation, with which an optimization of the operation of an agricultural vehicle is possible, by providing adjustment of an absolute position of a reference point of the treatment device which is movable relative to the vehicle.

In keeping with these objects and with others which will become apparent hereinafter, one feature of present invention resides briefly stated, in an agriculture vehicle provided with an evaluating unit which, from the data of a satellite navigation receiving unit, determines an absolute position of at least one reference point on a treatment device in a terrestrial reference system.

The determination of the absolute position is performed by a known computing algorithm which processes the transducer data from a GPS satellite. In order to provide a sufficient accuracy for the determination of the absolute position, a person skilled in the art can use means which are known from the prior art to reduce the error of the GPS position data. Additional vehicles sensors are used, which for example measure a yawing angle, a wheel rotary speed or a speed over ground, for the evaluation of reference signals which are transmitted from other radio stations.

With the present invention it is possible to control the treatment vehicle in accordance with the determined values actually exclusively from the determined position data in connection with a historic data cadastre and/or further machine-mounted sensors, or to distribute the determined position data in a determined position for controlling later treatments with the same or other agricultural vehicles with controllable treatment devices based on historic data cadastre.

In accordance with the present invention the agricultural vehicle has an evaluating unit which determines, from the data of the stabilized navigation receiving unit (GPS) the absolute position (Pb1, Pb2 . . . ) of at least one reference point (b1, b2, . . . ) on the treatment device in a terrestrial reference system. This makes possible in the known method for determination of operational data cadastres and terrain models, to replace the position of the vehicle by the exact position of the reference point on the treatment device and therefore to provide a higher position of the above mentioned method for an agricultural vehicle with a treatment device adjustable as to its position and the orientation. If the satellite navigation receiving unit is positioned in another point of an agricultural vehicle than the reference point (b1, b2, . . . ), the computing algorithm must take into consideration a coordinate transformation which corresponds to another position of the reference point (b1, b2, . . . ).

In accordance with a preferable embodiment of the present invention, a sequence of positions of at least one point on the treatment device, which during the traveling of the agricultural machine is obtained over the strip, is used as a basic position to produce a precise terrain model. During a new utilization of the agricultural vehicle on the same strip, the operational data stored in the historic data cadastre can be again used. The stored operational data than determined partially or completely the regulation of the position and orientation of the treatment device. In this way the operation of the agricultural vehicle is optimized and simultaneously the driver is unloaded.

In accordance with a preferable embodiment of the present invention, characteristic reference lines for the operation of the treatment device are utilized. They are used for improving the terrain profile, so that the drops or raises of the terrain and/or the inclination of the terrain transversely to the traveling direction are determined from the orientation of the above mentioned reference lines. In accordance with the present invention such a reference line (L1) is provided by the absolute position (Pb1) of the reference point (b1) and a further point or a vector. In accordance with a preferable embodiment of the invention, the speed vector (Vb1) of the reference point (b1) is utilized for determination of the reference line (L1). The speed vector can be taken either directly from the GPS data or a separate speed sensor with a directional sensor, or from two timely following positions of the reference point. In the case of a permanent ground distance (d1) of the reference point (b1) the angle of the reference line (L1) with the horizontal plane (xy) shows the drop or the raise of the ground in a traveling direction.

The reference lines (L1) can also represent the movement direction of one or several reference points of the treatment vehicle, for example its reference point, in the terrain. For this purpose the evaluating unit (AWE) with a suitable software calculates a movement vector as a reference line (L1) with a congruent reference point and a limiting point from the opposite position of the reference point and further sensor data, such as for example a wheel impact angle, a speed and a yawing angle determinable for example by an inertia sensor, a glass fiber gyroscope or a piezo gyroscope. In the case when a reference point and a limiting point to be computed are spaced from one another, additionally from the distance data of the reference point relative to the limiting point based on the geometry conditions, the position data of the limiting point are calculated from the position data of the reference point and then the movement vector as a reference line (L1).

Depending on the plot rate and speed of the agricultural vehicle, the movement vector of the limiting points can be determined also exclusively with computation of the position data, for example when each position of the vehicle is determinable at distances of less than 20 meter of the covered traveling stroke, or the assistance and computation of further sensor data are used when the plot rate goes beyond the above mentioned distance. The selection of the average distance is naturally dependent on the magnitude of the desired accuracy of the movement vectors and the requirements for the performed agricultural works in objective and economical way. The reference lines (L1) can be processed as a steering signal in a regulating electronic system of an automatic steering device. As a directional vector, the reference line (L1) can be drawn for example from a limiting point or a reference point from a nominal travel track or a treatment edge along the same. The regulating electronic system of the automatic steering device compares than the actual position value of the limiting reference point with the nominal position values along the reference line (L1) and provides, with a fixed deviation, and adjusting signal to the steering device which is suitable during a further forward travel to reduce the difference between the nominal position values and actual position values along the reference line L1.

In accordance with a further embodiment of the invention, a further reference line L2 which is typical for the application purpose of the treatment device is determined transversely to the preferable traveling direction. In accordance with the present invention, the reference line is determined by the reference point (b1) and a further point or vector. Also, in the invention a second reference (b2) can be used for determination of the reference line. With the same ground distance of the reference point, the angle of the reference line (L2) with the horizontal plane (xy) determines the transverse drop of the ground.

In accordance with the present invention, the height over the ground of points over the reference line must be known or determinable. The height is known for example when the ground distance is fixed by a non spring-biased chassis or by a known control circuit (for example by means of ground pressure sensors). Moreover, means a sensors are known which determine the height of the treatment devices over the ground. Such means are for example mechanical distance measuring devices or sonic altimeters. A preferable embodiment of the invention provides such means for determination of the ground distance for at least two points of the reference line L2. These means permit, during tilting of the treatment device relative to the ground, to perform an accurate determination of the transverse inclination of the ground surface.

A further preferable embodiment of the invention includes a data cadastre, in which with the position changes of the treatment device, the drops or raises and the transverse drops connected with the position (Pb1, Pb2 . . . ) of at least one reference point (b1, b2 . . . ) are stored. In this manner an improved terrain model is obtained, which facilitates the adjustment of the operational parameter of the vehicle during a subsequent treatment.

The invention is described as usable for agricultural vehicles. However, it is believed to be clear for a person skilled in the art that it can be used also in other vehicles, such as for example construction machines which treat and redesign a ground contour with their adjustable working tools. For realization of the inventive idea in another vehicle a person skilled in the art will experience no difficulties to provide corresponding adjustments.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
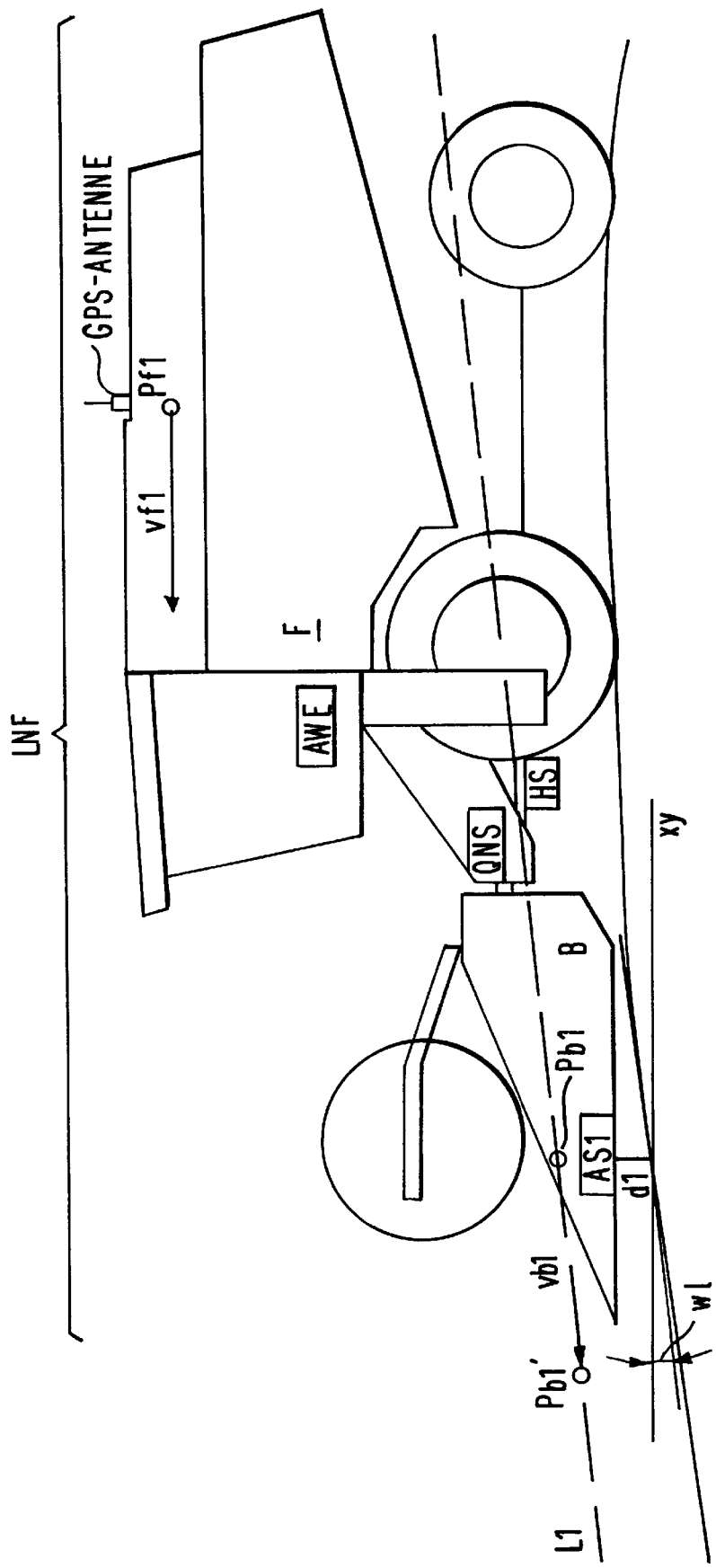
FIG. 1 is a side view of a combine harvester in accordance with the present invention.

FIG. 1 shows a combined harvester as an example of an agricultural vehicle (LNF) from one side. The longitudinal axis of the vehicle and the working device have in this case the same orientation. However, the cutter bar B is adjustable vertically relative to the main vehicle F. The horizontal plane of a terrestrial coordinate system is identified with the line (xy). The ground surface is inclined relative to the line (xy) under a reference point (b1) of the treatment device at an angle of inclination (W1). It can be completely different from the inclination of the ground surface under the vehicle. This leads to the situation that the speed vector (vf1) of reference point Pf1 on the vehicle with an unchanged adjustment of the height can have another orientation than the speed vector (vb1) of the reference point (b1) on the treatment device. If the distance D of the reference point (b1) to the ground surface during the positioning changes (Pb1, Pb1') remains the same, then the angle between the speed vector (vb1) and the horizontal plane (xy) corresponds to the inclination angle (W1) of the ground surface under the reference point (b1). The reference line (L1) is determined here by the absolute position (Pb1) of the reference point (b1) and the speed vector (vb1), which is also determined by the reference point (Pb1'). The value of the reference line (L1) can be used then as a control basis for controlling the treatment device B or as a characteristic value for the ground contour for depositing in the historic data cadaster.

A height sensor (HS) and a transverse inclination sensor (QNS) are identified schematically. With these sensors, the relative height position and transverse inclination of the treatment device B to the vehicle F on which it is mounted, can be determined. Also a ground distance sensor (AS1) is identified only schematically, and it can determine the distance to the reference point from the ground. A GPS antenna is schematically shown on the roof of the combine harvester F associated with the point (Pf1). With the evaluation unit (AWE) the absolute position of the point (Pf1) determined by the satellite navigation is transformed on the treatment device B as shown from the illustration of FIG. 6.

Figure 2:
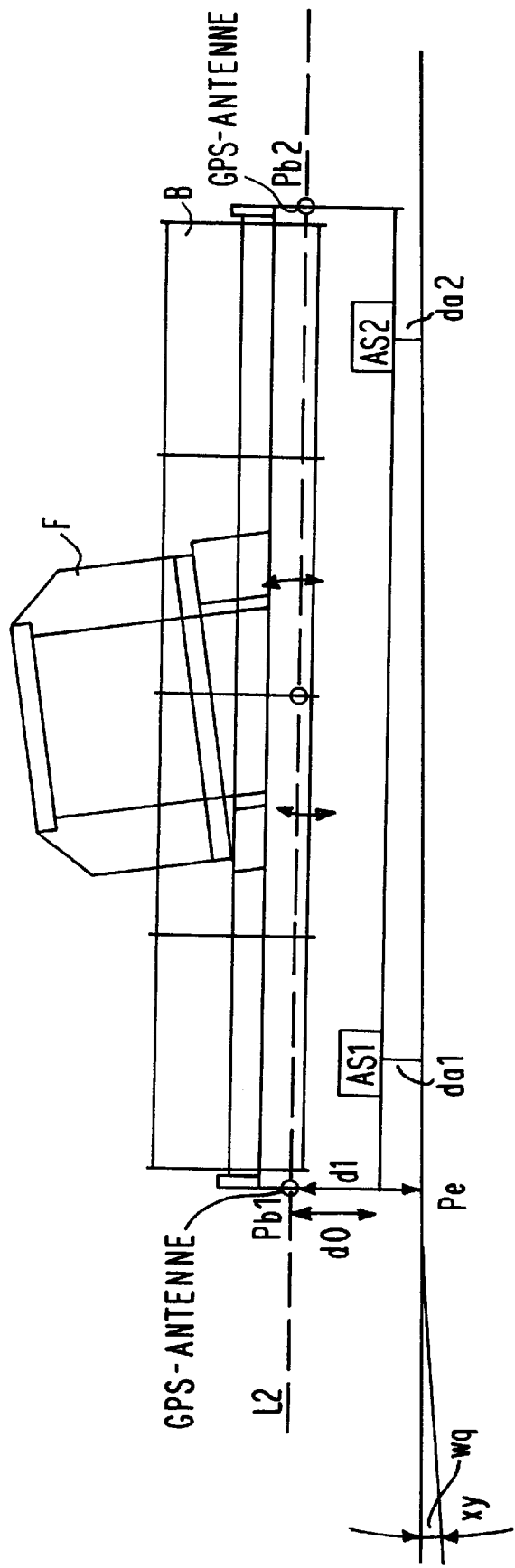
FIG. 2 is a front view of the inventive combine harvester.

FIG. 2 shows a front view of the combine harvester. It illustrates a tilting of the treatment device relative to the combine harvester and relative to the ground surface and the associated parameters. The horizontal plane of the terrestrial coordinate system is again identified with the line (xy). The ground surface under the treatment device is inclined in the middle at an angle (Wq). This inclination can be completely different from the inclination of the ground surface under the vehicle, which here is identified by a tilting of the vehicle in another direction. The reference line (L2) is provided as a connecting line of two reference points (b1, b2) on the treatment device. The distance sensors (AS1, AS2) determine the distance (da1, da2) of two points of the treatment device (a1, a2) from the ground surface. From the geometrical conditions, the distances (d1, d2) of the reference points (b1, b2) from the ground surface are calculated. The distance of the reference points from the ground surface in the ideal case is identical to the sum of the minimal distance (d0) of the reference points (b1, b2) from the ground surface, or in other words the distance of the reference point when the cutter bar lies on the ground, and the preset ground distance or cutting height (da(x)) are identical. The same distances (d1, d2) of the reference points (b1, b2) provide the angle of reference line (L2) with the horizontal plane (xy) directly with the central inclination angle (Wq) of the ground surface under the treatment unit. In this embodiment of the invention a GPS antenna is located on each reference point (b1, b2). With a difference of the distances (b1, b2) the average inclination angle (Wq) can be calculated from the geometrical conditions.

Figure 3:
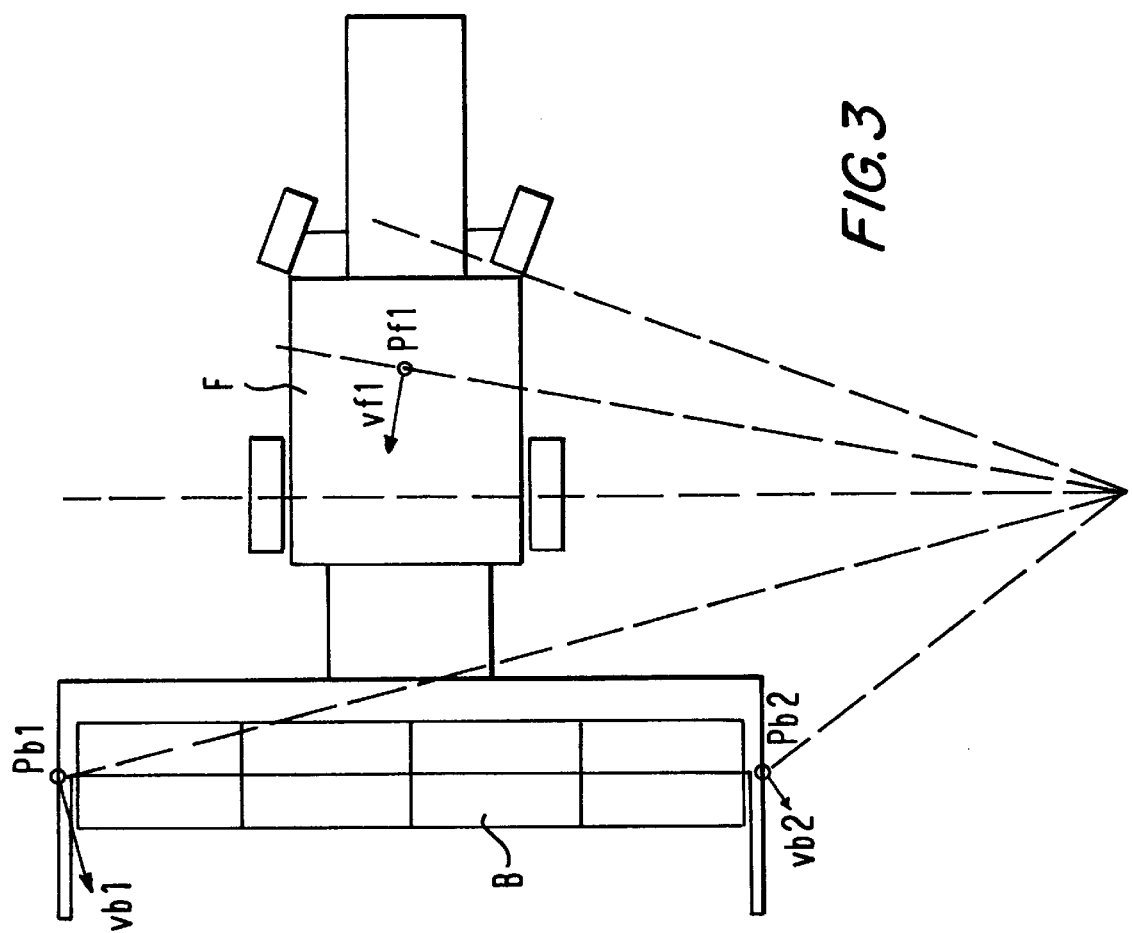
FIG. 3 is a top view of the inventive combine harvester.

FIG. 3 shows the combine harvester from above. The drawing clearly illustrates that the reference line (L1) which is determined from the speed vector (vb1) and the reference point (b1) is not necessarily parallel to the longitudinal axis of the vehicle or the treatment device.

Figure 4:
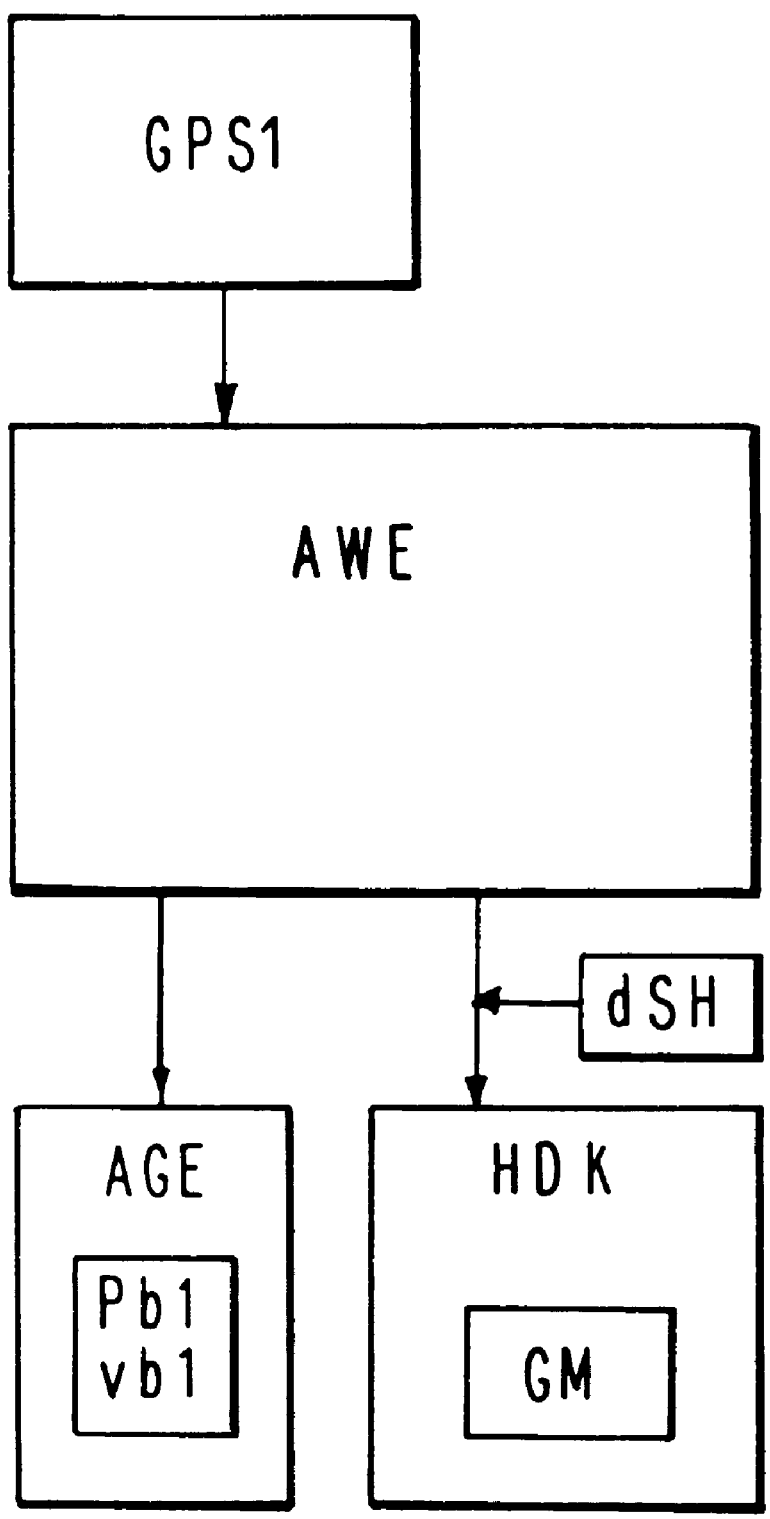
FIG. 4 is a block diagram of an evaluating unit of the inventive vehicle.

FIG. 4 shows a block diagram of the simplest version of the inventive evaluating unit (AWB). It is provided that the receiver (antenna) of a GPS satellite navigation receiving unit (GPS1) is mounted directly on the reference point (b1) of the treatment device B. In this case the function of the evaluating unit (AWE) is limited to process the data of the GPS receiver, so that the absolute position (Pb1) and optionally the absolute speed (vb1) of the reference point (b1) are indicated on an indicating unit (AGE) stored in a high data cadastre (HDK) and/or supplied to a control device (not shown) for the height/transverse inclination of the cutter bar B. For producing and storing a terrain model (GM) in the data cadastre it suffices in this simplest case to calculate the distance (d1) of the point (b1) from the ground surface from the distance (d0) and the preadjusted cutting height (dSH) by addition and drawn off from the height coordinate from the position (Pb1). The value of (d0) depends on where the reference point on the cutter bar B is arranged, and (d0) can have the value of approximately zero.

Figure 5:
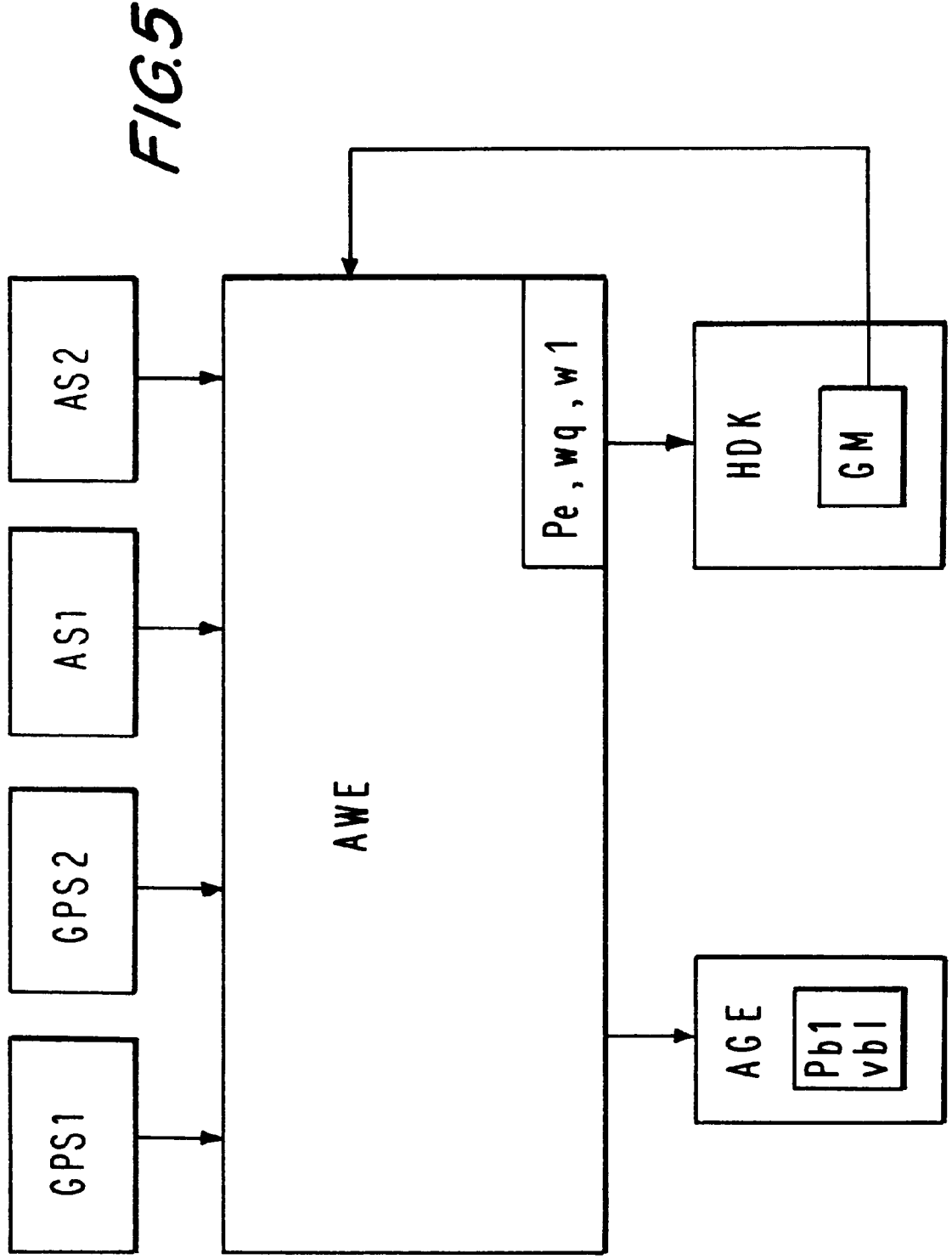
FIG. 5 is a block diagram of a further evaluating unit of the inventive vehicle.

FIG. 5 shows a block diagram of a preferable embodiment of the inventive evaluating unit. Here the functions of the version of the evaluating unit of FIG. 4 are completed. The evaluating unit determines from the data of the GPS receivers (GPS1, GPS2) the absolute positions (Pb1, Pb2) of the second reference points (b1, b2) and the speed vector (vb1) of a reference point (P1). From this data the reference line (L1) and/or (L2) is generated. In addition, two distance sensors (AS1, AS2) measure the distances of the points (a1, a2) from the ground surface. From the geometrical conditions the evaluating unit interpelates the distances (d1, d2) of the reference points (b1, b2) from the ground surface and the angle (Wq) which the ground surface assumes to the horizontal plane. Further, the evaluating unit determines, from the inclination of the reference line (L1) and two subsequent measurements of the ground distance (d1, d1'), the inclination angle (w1) of the ground surface. From the positions of the points (b1, b2), an improved terrain model is produced, which is stored in the data cadastre for a new treatment of the strip with an available agricultural vehicle.

Figure 6:
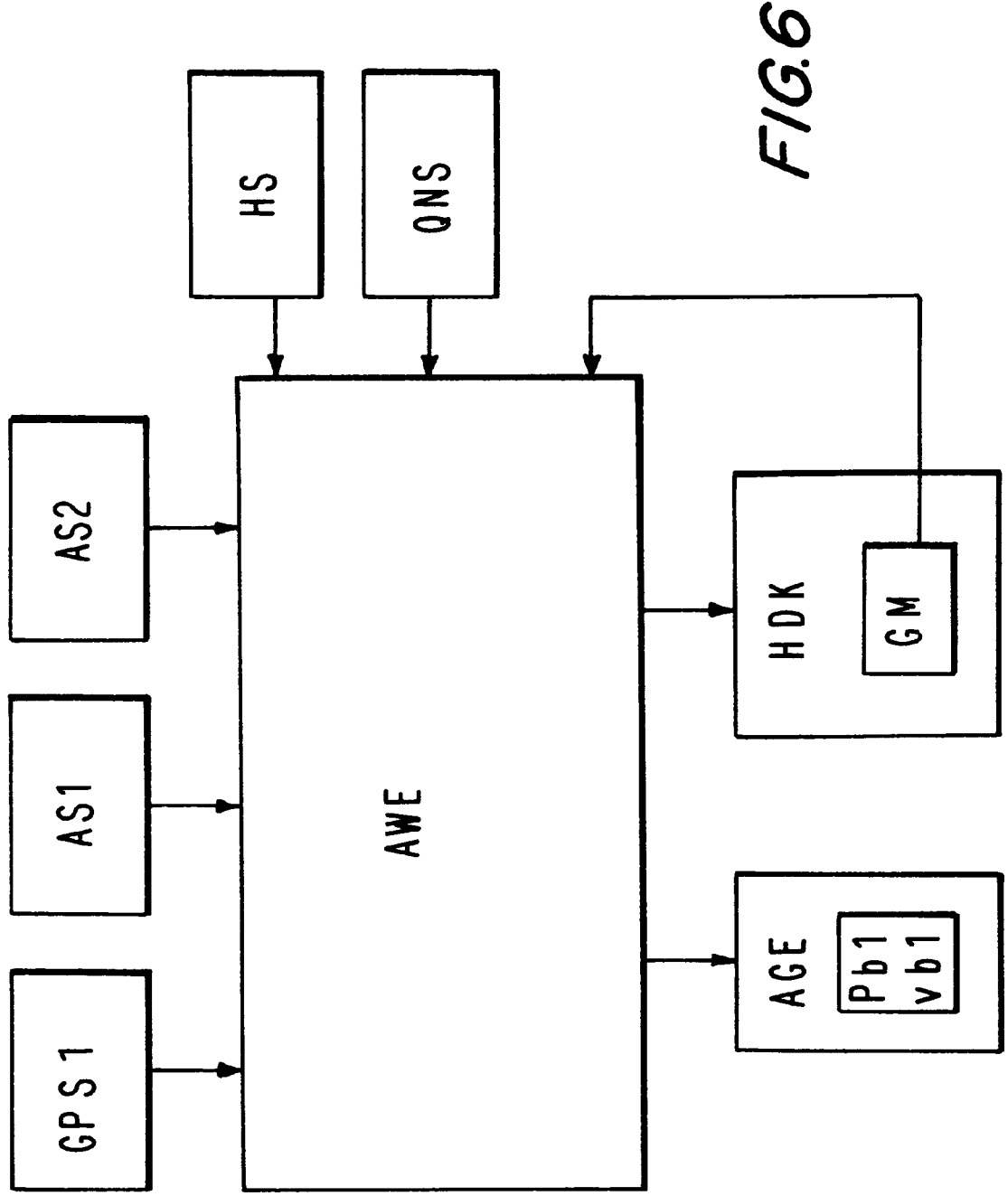
FIG. 6 is a block diagram of still another evaluating unit of the inventive vehicle.

FIG. 6 shows a block diagram of a further embodiment of the evaluating unit (AWE). In this case, a satellite evaluating unit (GPS1) is located on the vehicle F, compare with FIG. 1, and not on the cutter bar adjustable relative to the vehicle. The position determined in this manner for a predetermined point of the vehicle F is supplied to the evaluating unit (AWE). Simultaneously, the evaluating unit (AWE) supplies the signal of the height sensor (HS), which provides the relative height position of the cutter bar B relative to the vehicle F. Moreover, it is provided that the evaluating unit (AWE) also supplies the signal of the transverse inclination sensor (QNS) which provides the relative transverse inclination of the cutting bar of the vehicle F. From this data the evaluating unit (AWE) determines the absolute position of the reference points and/or lines on the treatment device B in a terrestrial reference system. With the assistance of the ground distance sensors (AS1, AS2) arranged on the treatment device B the connection to the ground surface profile is produced.

Figure 7:
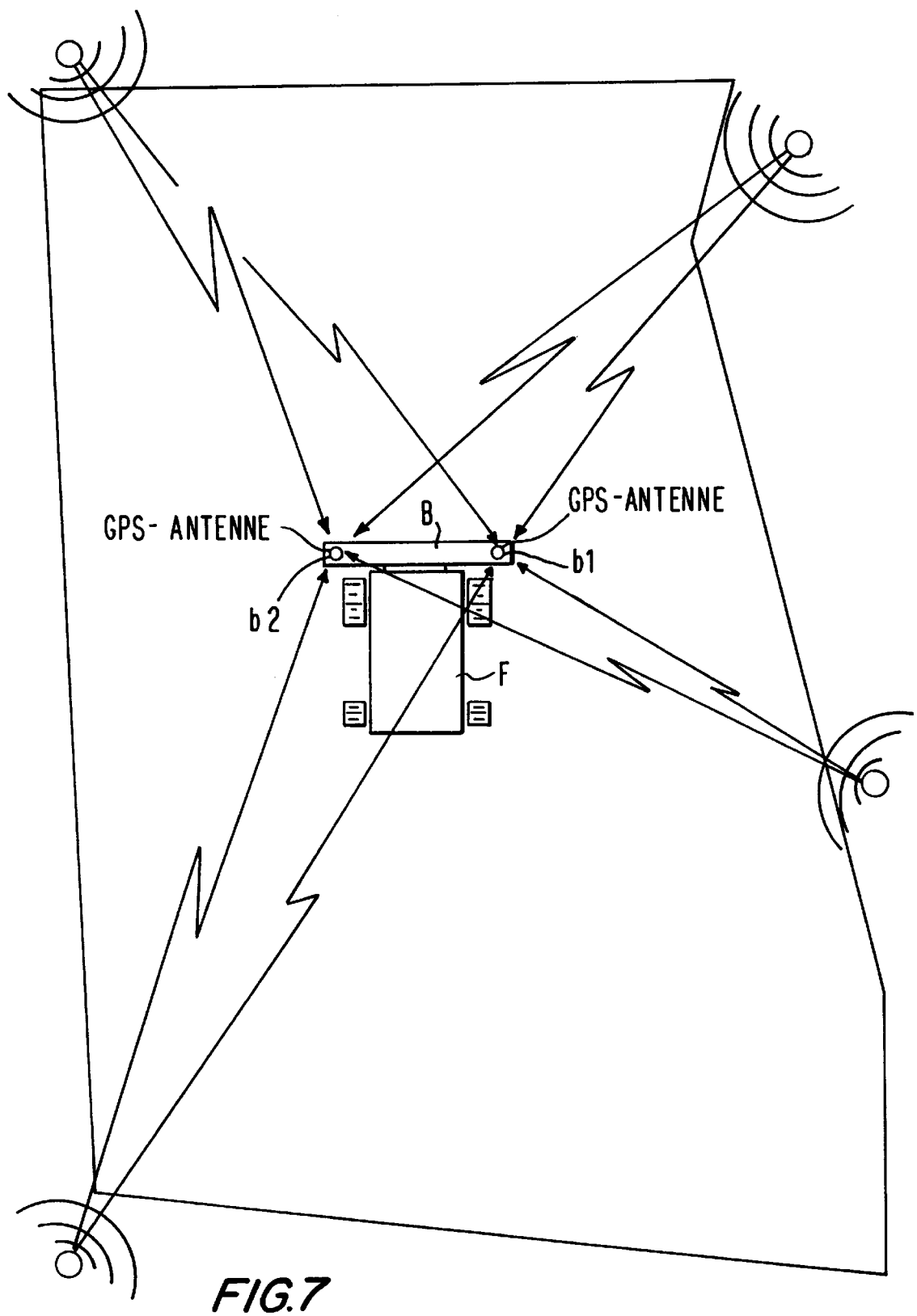
FIG. 7 is a view showing a combined harvester in accordance with the present invention on a field.

FIG. 7 shows schematically a combine harvester on a field, which receives position signals from four ground-connected stationary basic stations for position determination of the reference point on the treatment device/cutter bar (b1, b2). The basic stations, whose position is very accurately measured in a terrestrial reference system, sends GPS signals as so-called pseudo satellites, in equivalence for satellites navigation with satellites which revolve around the earth in space. The signals of such pseudo satellites can be used as a correction factor for highly accurately operating GPS system. The combine harvester in accordance with this embodiment has satellite receiving antennas at both sides of the cutter bar.

The embodiment of FIGS. 1–7 is illustrated for a combine harvester. For a person skilled in the art, with his professionally notorious knowledge it will be an easy task to transfer the proposed inventive device to another agricultural vehicle. For example, it is recommended to use a tractor with a plough as an agricultural vehicle, and to use frame points of the plough as reference points (b1, b2 . . . ) whose working height is to be determined. With the inventive device the working depth of a plough can be controlled with simultaneous or alternative plotting, correction and/or with the help of an available historic data cadastre. Instead of a plough, naturally all other combinations of a tractor with known treatment devices are adjustable, such as drills, seeders, harrows, breakers, scooping devices, presses, cutting mechanisms, reversers, swathers, in which correspondingly suitable reference points (b1, b2) are selected. In the same way the inventive device can be utilized with other agricultural vehicles, such as for example forage harvesters, sugar beet diggers, potato laying machines, and harvesters. In order to use the invention for different agricultural vehicles or exchangeable devices, such as for example various treatment devices on a tractor or alternating cutter bars or corn teeth on a combine harvester, the evaluating unit (AWE) in addition must be available through an input possibility, through which they are adjustable correspondingly to the determined reference points (b1, b2 . . . ) when the reference points are not determinable automatically through a mounted device switch and/or with access to a memory.

It will be understood that each of the elements described above, or two or more together, may also find a useful application in other types of constructions differing from the types described above.

While the invention has been illustrated and described as embodied in agricultural vehicle with treatment device which is adjustable in its position and/or orientation relative to the vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An agricultural vehicle, comprising a main vehicle; a treatment device arranged adjustably relative to said main vehicle with respect to at least one a position and an orientation of said treatment device; a satellite navigation receiving unit provided on a point of said main vehicle for determination of a position of said main vehicle; and an evaluating unit which determines from data of said satellite navigation receiving unit an absolute position of at least one reference point on said treatment device in connection with at least one sensor which allows to determine a relative position of said treatment device to said main vehicle.

2. An agricultural vehicle as defined in claim 1, wherein said satellite navigation receiving unit has a receiving antenna which is mounted on a reference point of said treatment device for determination of an absolute position of said at least one reference point.

3. An agricultural vehicle as defined in claim 1, wherein said satellite navigation receiving unit has a receiving antenna arranged on a point of said main vehicle for determination of a position of said at least one reference point; and further comprising a sensor determining a relative position of said treatment device to said main vehicle.

4. An agricultural vehicle as defined in claim 1; and further comprising a height sensor determining a relative height of said treatment device relative to said main vehicle.

5. An agricultural vehicle as defined in claim 1; and further comprising a transverse inclination sensor which determines a relative transverse inclination of said treatment device relative to said main vehicle.

6. An agricultural vehicle as defined in claim 1; and further comprising a sensor selected from the group consisting of a height sensor for determining a relative height of said treatment device relative to said main vehicle and a transverse inclination sensor for determining a relative transverse inclination of said treatment device relative to said main vehicle, said evaluating unit receiving a signal from said at least one sensor and transforming an absolute position of a point on the main vehicle determined by a satellite navigation to at least one reference point on said treatment device for determination of its absolute position.

7. An agricultural vehicle as defined in claim 1, wherein said evaluating unit is formed so that with use of said absolute position of said at least one reference point and a further point or a vector, it determines a characteristic reference line in a terrestrial reference system for an application of said treatment device.

8. An agricultural vehicle as defined in claim 7, wherein said evaluating unit determines said characteristic reference line which is provided by said reference point and a direction of a speed vector of said reference point.

9. An agricultural vehicle as defined in claim 7; and further comprising control electronic means of an automatic steering device arranged so that said reference line is further processed in said control electronic means as a steering signal.

10. An agricultural vehicle as defined in claim 7, wherein said evaluating unit is formed so that it determines a further characteristic reference line by said reference point and a further point or a vector.

11. An agricultural vehicle as defined in claim 10, wherein said evaluating unit determines said further reference line from said reference point and said further point or said vector transversely to a preferable traveling direction and therefore substantially perpendicular to said first mentioned reference line.

12. An agricultural vehicle as defined in claim 10, wherein said evaluating unit is formed so that said further reference line is determined by said first mentioned reference point and a second reference point.

13. An agricultural vehicle as defined in claim 10; and further comprising means for determining a transverse inclination of a ground surface from said further reference line.

14. An agricultural vehicle as defined in claim 10; and further comprising means for regulating a ground distance and a transverse inclination of said treatment device with the use of said further reference line.

15. An agricultural vehicle as defined in claim 12, wherein said evaluating unit determines said further reference line from said two reference points so that said two reference points in an immovable condition are located at a same distance over a ground surface and an inclination of said further characteristic line corresponds to an inclination of the ground surface.

16. An agricultural vehicle as defined in claim 15, wherein said both reference points are determined so that said inclination of said reference line corresponds to an inclination of the ground surface transversely to a preferable traveling direction.

17. An agricultural vehicle as defined in claim 1; and further comprising means for determining a distance from a ground surface of at least one of a reference point and a reference line.

18. An agricultural vehicle as defined in claim 1, wherein said evaluating unit is formed so that from a distance and a transverse inclination of said treatment device it determines a transverse inclination of a ground surface and further comprising means for continuously indicating said transverse inclination of said treatment device and said transverse inclination of said ground surface during position changes of said main vehicle and computing a three-dimensional terrain profile.

19. An agricultural vehicle as defined in claim 1; and further comprising means for determining a direction of a speed vector of said reference point received from data of said satellite navigation receiving unit, from two timely successive absolute positions of said reference point.

20. An agricultural vehicle as defined in claim 19; and further comprising means for determining a direction of a speed vector of said reference point from data of said satellite navigation receiving unit from sensor means for determining a speed.

21. An agricultural vehicle as defined in claim 1; and further comprising means for calculating a direction of a speed vector from a relative position and a relative speed of said reference point to a reference point on said main vehicle and an absolute position and a speed of said reference point.

22. An agricultural vehicle as defined in claim 1, wherein said satellite navigation receiving unit is provided with ground connected pseudo satellites.

23. An agricultural vehicle as defined in claim 1, wherein a reception of said satellite navigation receiving unit is supported by ground connected pseudo satellite.

24. An agricultural vehicle as defined in claim 1; and further comprising means for performing an additional dead reckoning navigation.

25. An agricultural vehicle as defined in claim 24, wherein said means for additional dead reckoning navigation include a gyro compass.

26. An agricultural vehicle as defined in claim 1; and further comprising means for storing a value selected from the group consisting of a drop, an inclination, and a transverse drop, joined with a position of said at least one reference point.

27. An agricultural vehicle as defined in claim 1, wherein said treatment device with use of values determined by said evaluating unit is controllable exclusively by determined position data in connection with a historic data cadastre.

28. An agricultural vehicle as defined in claim 1, wherein said values determined by said evaluating unit referred to said treatment device, are placed in a historic data cadastre, to control further treatments with same or other agricultural vehicles with controllable treatment devices on the basis of the historic data cadastre.

* * * * *